United States Patent
Heins et al.

(10) Patent No.: US 9,821,643 B1
(45) Date of Patent: Nov. 21, 2017

(54) GUIDE BLOCK FOR SUNROOF OF AN AUTOMOBILE

(71) Applicant: AISIN TECHNICAL CENTER OF AMERICA, INC., Northville, MI (US)

(72) Inventors: Ryan Heins, Ann Arbor, MI (US); Shintaro Katsura, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 15/334,620

(22) Filed: Oct. 26, 2016

(51) Int. Cl.
  *B60J 7/04* (2006.01)
  *B60J 7/02* (2006.01)
  *B60J 7/043* (2006.01)

(52) U.S. Cl.
  CPC ............... *B60J 7/024* (2013.01); *B60J 7/02* (2013.01); *B60J 7/0435* (2013.01)

(58) Field of Classification Search
  CPC ............ B60J 7/02; B60J 7/024; B60J 7/0435
  USPC ................. 296/223, 216.02–216.05
  See application file for complete search history.

(56) References Cited

U.S. PATENT DOCUMENTS

| 6,416,122 B1 * | 7/2002 | Schwarz ............... B60J 7/047 296/220.01 |
| 9,272,608 B2 | 3/2016 | Sawada et al. |
| 9,290,085 B2 | 3/2016 | Sawada et al. |
| 2009/0079234 A1 * | 3/2009 | Faerber ............... B60J 7/192 296/216.05 |

* cited by examiner

*Primary Examiner* — Dennis H Pedder
(74) *Attorney, Agent, or Firm* — Oblon, McClelland, Maier & Neustadt, L.L.P.

(57) ABSTRACT

A guide block for a sunroof of an automobile including a front channel extending upwards and connecting to a lower channel at a first angle with respect to the lower channel forming a first path, and a rear channel extending upwards and connecting to an upper channel at a second angle with respect to an upper channel forming a second path, where the first path intersects the second path at a cross-over region.

11 Claims, 7 Drawing Sheets

GUIDE BLOCK FOR SUNROOF OF AN AUTOMOBILE

BACKGROUND

Field of the Disclosure

This disclosure relates generally to improvements to a movable sunroof. More particularly the present disclosure relates to a guide block for achieving a defined movement while opening or closing the sunroof.

Description of the Related Art

Typically, a sunroof of an automobile includes a sliding panel that slides relative to a roof of the automobile. Such a displacement of the sliding panel is achieved by a guide link or a guide block.

A guide block is attached to a side edge of a sliding panel. A guide block can have a guide slot or channel with a steep upward path. A guide pin can be inserted into this guide slot which creates a rapid upward or downward movement of the sliding panel while tilting and/or sliding. The tilting of the sliding panel creates a gap between the side of the sliding panel and the roof. Such a gap may have undesirable effect on the aesthetics and/or aerodynamics characteristics of the automobile.

Furthermore, the guide blocks can be large and heavy which requires higher power to move the guide block to cause displacement of the sliding panel. A large guide block will also require a larger rail for mounting, thus space and weight concerns may arise. Furthermore, a large guide block can add to noise generated while moving the sliding panel of the sunroof. Thus, a guide block having smaller size and providing efficient pin movements without creating a gap between the sliding panel and the roof is required.

SUMMARY

According to an embodiment of the present disclosure, there is provided a guide block for a sunroof of an automobile. The guide block includes a front channel extending upwards and connecting to a lower channel at a first angle with respect to the lower channel forming a first path, and a rear channel extending upwards and connecting to an upper channel at a second angle with respect to an upper channel forming a second path, where the rear channel intersects the lower channel at a cross-over region.

Further, there is provided a guide block that includes a front channel extending upwards and connecting to a lower channel at a first angle with respect to the lower channel forming a first path, a rear channel extending upwards and connecting to an upper channel at a second angle with respect to an upper channel forming a second path, wherein the rear channel intersects the lower channel at a cross-over region, and a check block slidably connected to the front channel.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s).

It is to be understood that terms such as "left," "right," "front," "rear," "side," "height," "length," "width," "upper," "lower," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figures 1A, 1B:
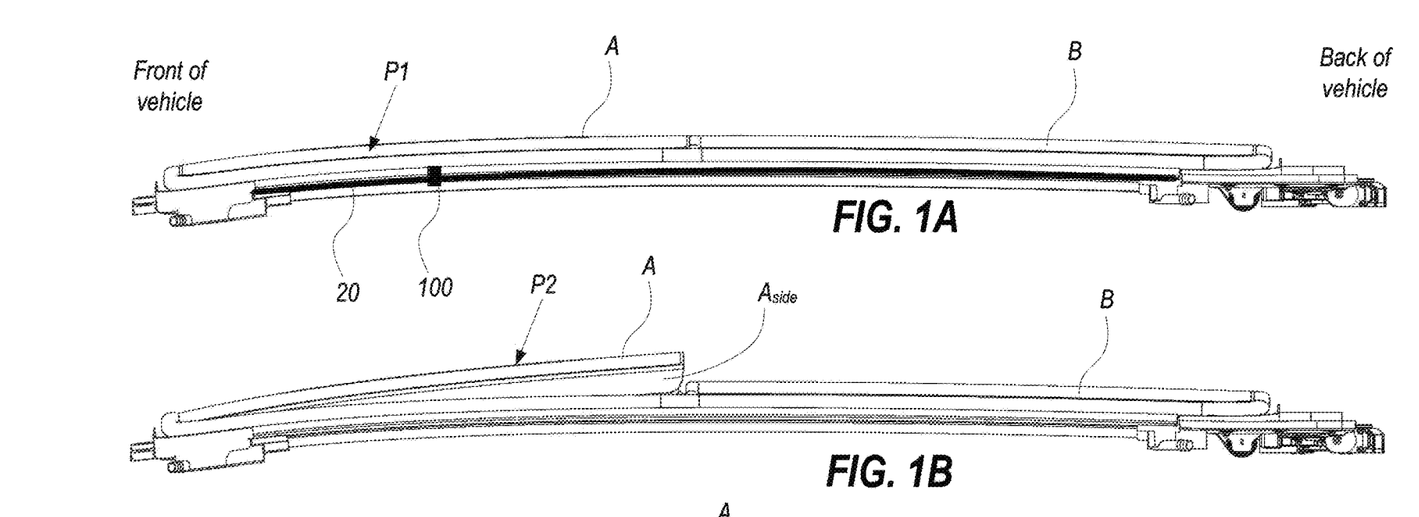
FIG. 1A illustrate a sunroof of an automobile in a first position according to an exemplary embodiment of the present disclosure.
FIG. 1B illustrate a sunroof of an automobile in a second position according to an exemplary embodiment of the present disclosure.
Figure 1C:
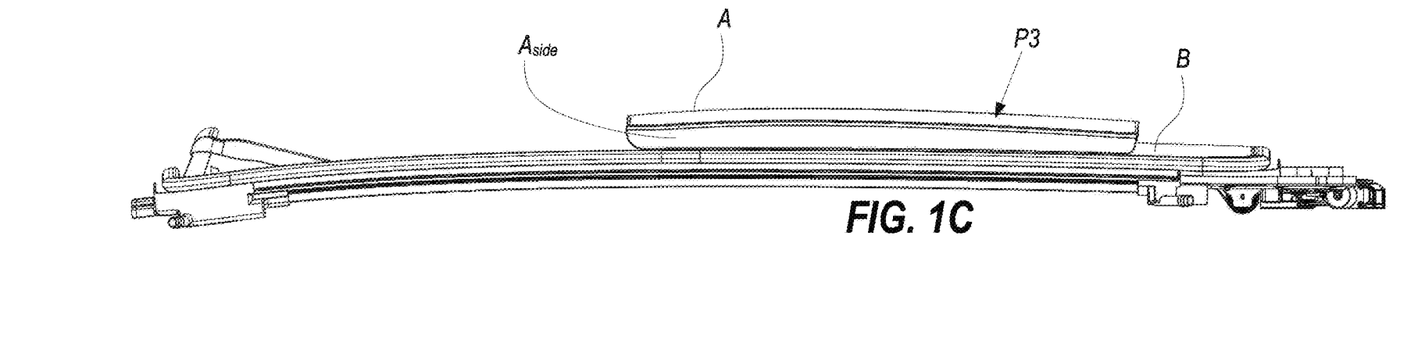
FIG. 1C illustrate a sunroof of an automobile in a third position according to an exemplary embodiment of the present disclosure.

FIGS. 1A-1C illustrates a sunroof of an automobile in a first position P1, a second position P2, and a third position P3, respectively, according to an exemplary embodiment of the present disclosure. The sunroof of an automobile includes a first panel A having a side garnish $A_{side}$ and a second panel B. The first panel A is connected to a sliding mechanism (not shown) that allows the first panel A to tilt and slide over the second panel B. The sliding mechanism enables the first panel A to occupy the first position P1 (also referred as closed position), the second position P2 (also referred as tilted portion), and the third position P3 (also referred as open position). The sliding mechanism includes a guide block 100 that defines the tilting and sliding motion of the first panel A.

Typically, the guide block 100 is installed on a rail 20 of the sliding mechanism. The conventional guide blocks of the sliding mechanism leaves a gap between the first panel A and the second panel B when sliding. The guide block 100 of the present disclosure allows the first panel A, particularly the side garnish $A_{side}$, to remain flushed with the second panel B, thus eliminating the gap.

Figure 2:
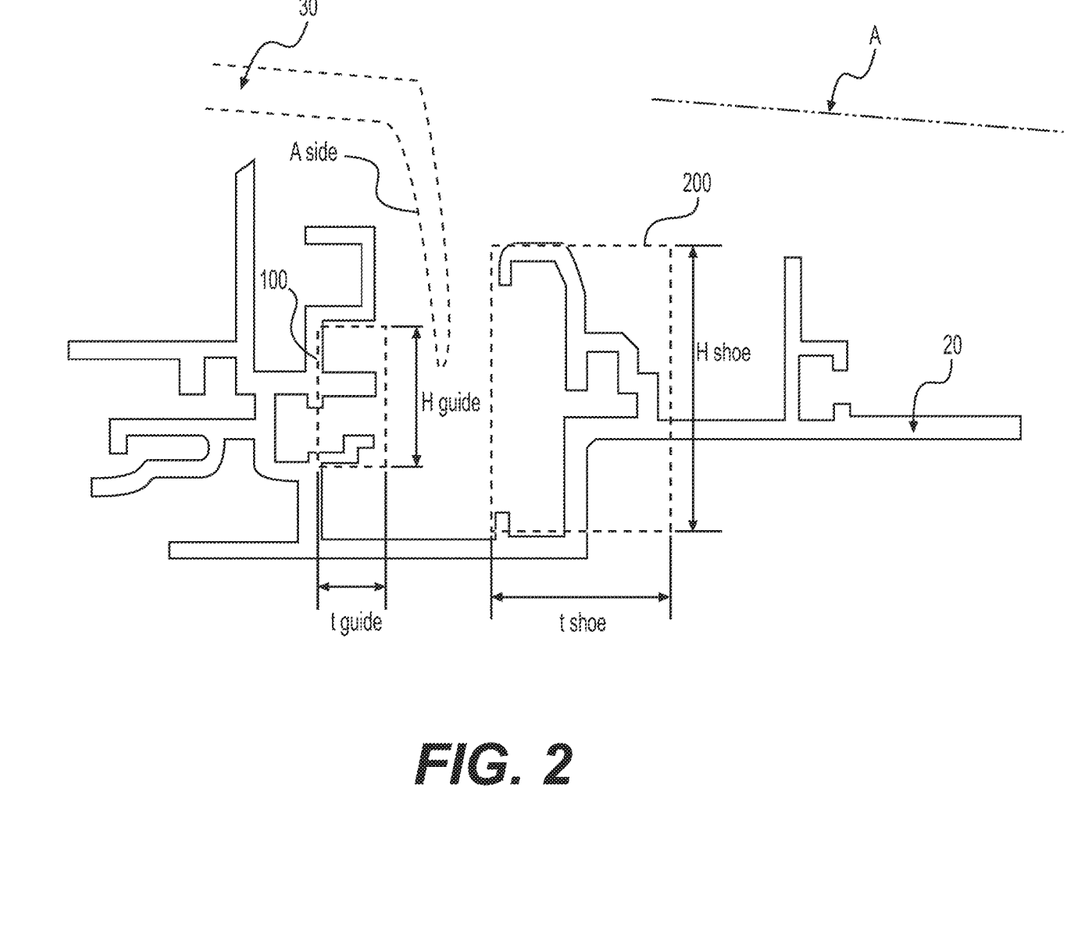
FIG. 2 illustrates a location of the guide block on a rail according to an exemplary embodiment of the present disclosure.

FIG. 2 illustrates a location of the guide block 100 on the rail 20 according to an exemplary embodiment of the present disclosure. The rail 20 is installed below a roof 30 along the length of the vehicle. The guide block 100 is located on an inner side (left side) with respect to a shoe 200, which is part of the sliding mechanism (not illustrated). The inner side has a smaller dimension compared to the outer side (right side) where the shoe 200 is installed. Hence, the dimensions of the guide block 100 are restricted by the structure of the rail 20 (dotted box). The guide block 100 can be of height $H_{guide}$ and thickness $t_{guide}$. The $H_{guide}$ is shorter than a shoe height $H_{shoe}$, the height of the shoe 200. Also, the thickness $t_{guide}$ is less than a shoe thickness $t_{shoe}$, the thickness of the shoe 200.

Figure 3:
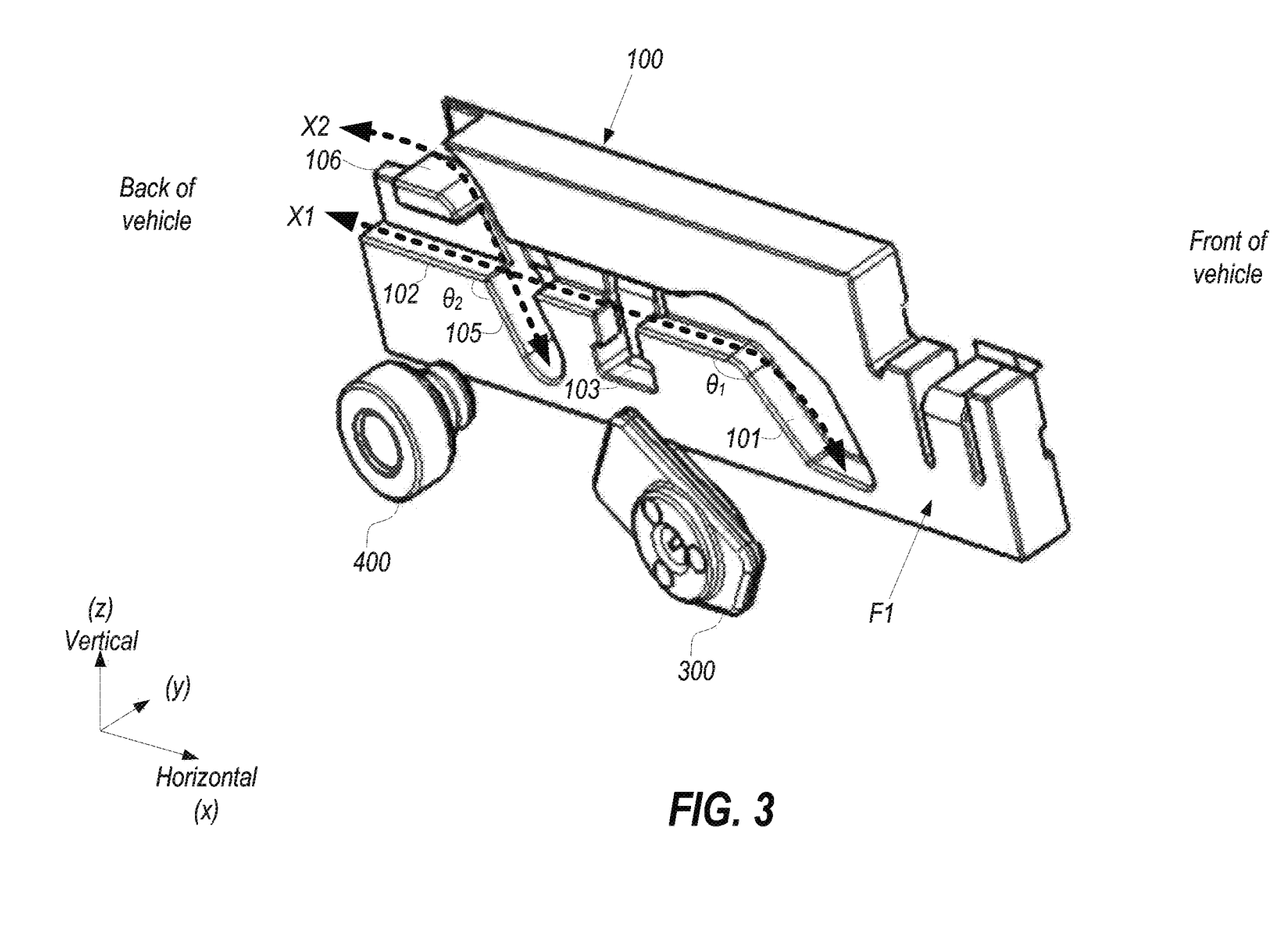
FIG. 3 is a perspective view of the guide block according to an exemplary embodiment of the present disclosure.

FIG. 3 is a perspective view of the guide block 100 according to an exemplary embodiment of the present disclosure. The guide block 100 is a substantially rectangular block with channels formed on a first surface F1 (x-z plane) of the rectangular block. The first surface F1 is a surface with largest surface area compared to the remaining surfaces of the rectangular block. The guide block 100 includes a front channel 101, a lower channel 102, a rear channel 105, and an upper channel 106. Optionally, the guide block 100 can include a mid-channel 103. The channels 101, 102, 103, 105, and 106 are formed on the first surface F1 and have a depth along the y-axis (perpendicular to the first surface F1). The depth of the channels 101, 102, 103, 105, and 106 can vary.

The front channel 101 extends upward to connect to the lower channel 102 at a first angle $\theta_1$ with respect to a lower channel forming a first path X1. The rear channel 105 extends upwards to connect to the lower channel 102 at a second angle $\theta_2$ with respect to the upper channel 106 forming a second path X2. The first angle $\theta_1$ of the front channel 101 is greater than the second angle $\theta_2$ of the rear channel 105 making the rear channel 105 steeper than the front channel 101. Furthermore, the lower channel 102 and the upper channel 106 extend backwards in a horizontal direction and are substantially parallel to each other.

The mid-channel 103 can be formed between the front channel 101 and the rear channel 105. The mid-channel 103 can have an inverted-T shape. The mid-channel 103 can be formed for manufacturing attaching means such as a clip (not shown) that allows the guide block 100 to connect to the rail 20. For example, during an injection molding of the guide block 100, the mid-channel 103 can be formed using dies for making the clip. The mid-channel 103 can also facilitate addition of attaching means that can be arranged parallel to the clip located behind the front channel 101.

Furthermore, the guide block 100 can be connected to a check block 300 and a guide pin 400. The check block 300 can be slidably connected to the front channel 101 and the guide pin 400 can be slidably connected to the rear channel 105. The check block 300 can travel along the path X1 and the guide pin 400 can travel along the path X2.

The guide block 100 has a unitary construction. The guide block 100 can be made of different materials including metallic and non-metallic materials such as steel, cast iron, aluminum, or plastic. The channels 101, 102, 103, 105, and 106 can be formed using standard machining and manufacturing processes such as milling, shaping, cutting, forming, molding, etc.

Figure 4A:
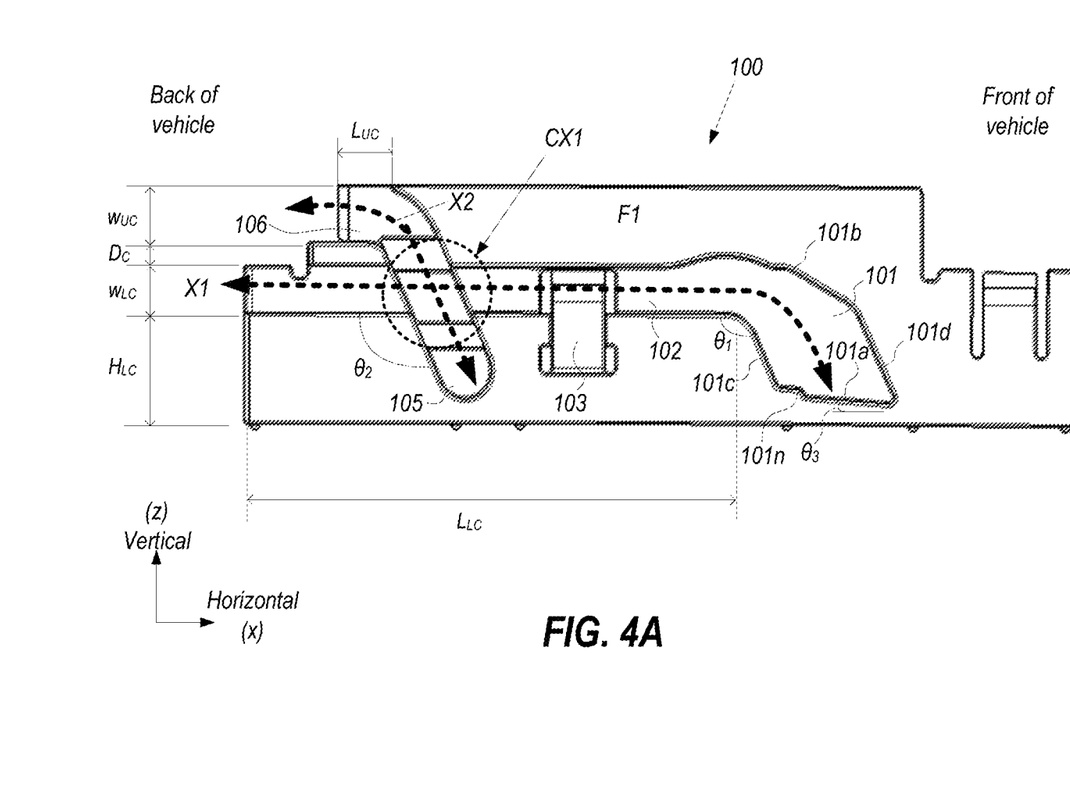
FIGS. 4A-4B illustrates an elevation and side view, respectively, of the guide block and a cross-over region according to an exemplary embodiment of the present disclosure.
Figure 4B:
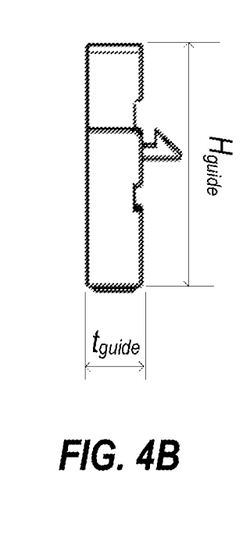

FIGS. 4A and 4B illustrate an elevation view and a side view, respectively, of the guide block 100 according to an exemplary embodiment of the present disclosure. The front channel 101 has a base edge 101a that is seamlessly connected to a curved edge 101b by side edges 101c and 101d. The front channel 101 has a variable width that increases from the lower channel 102 to the base edge 101a in a non-linear manner. Furthermore, the base edge 101a can include a notch 101n to prevent a horizontal movement of an element (e.g., the check block 300) connected in the front channel 101. The notch 101n can also facilitate the orientation and an upwards movement of check block 300 along the first channel 101. In the absence of the notch 101n, the check block 300 will be blocked by the side edge 101c and will be unable to orient upwards and move to the lower channel 102. Optionally, the base edge 101a can be inclined at a third angle $\theta_3$, measured with respect to the horizontal or x-axis, to allow easier upward movement of the check block 300 (not shown in FIGS. 4A and 4B).

Figure 4C:
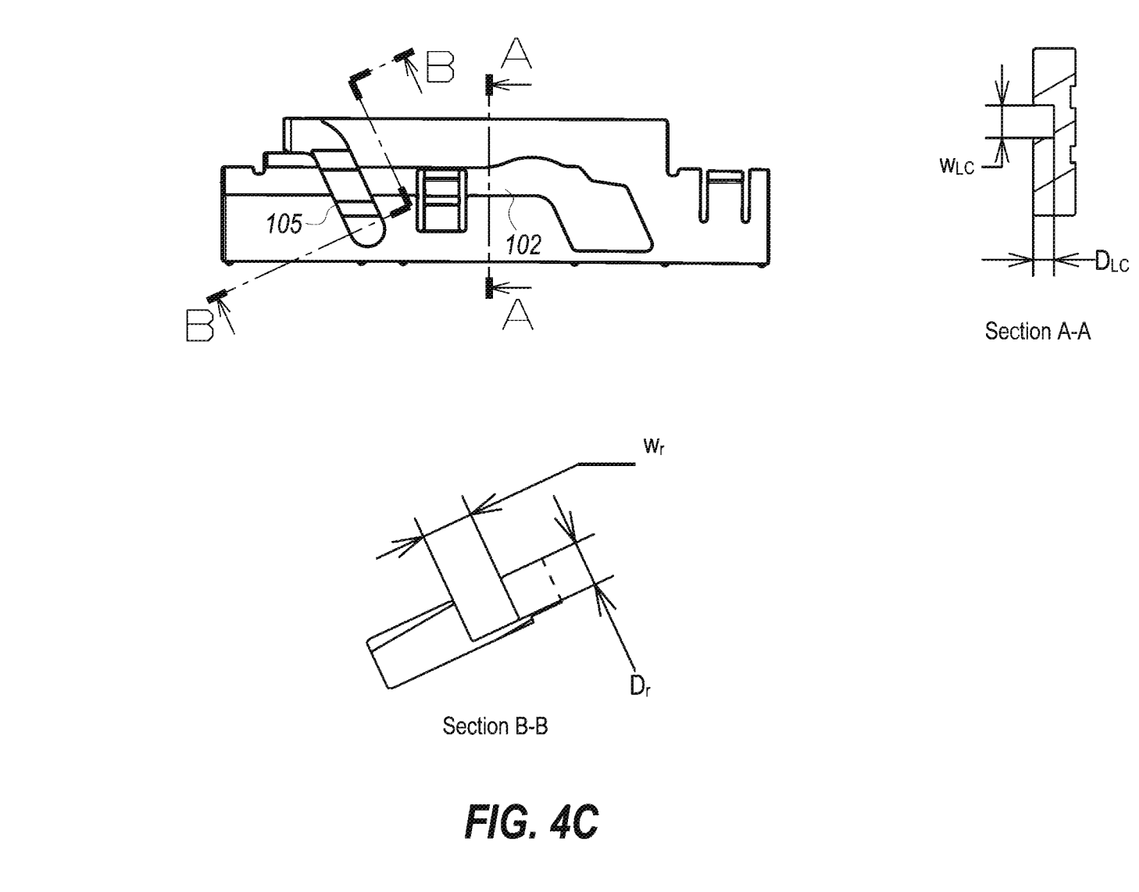
FIG. 4C shows cross-section views of a rear channel and a front channel of the guide block according to an exemplary embodiment of the present disclosure.

The rear channel 105 is substantially straight, has uniform width and a length, which is greater than a length of the front channel 101. Referring to FIG. 4C, the section B-B shows the rear channel 105 has a width $w_{RC}$ and a depth $D_{RC}$. The section A-A shows the lower channel 102 has a width $w_{LC}$ and a depth $D_{LC}$. The ratio widths ($w_{RC}/w_{LC}$) can be greater than 1, for example, the ratio ($w_{RC}/W_{LC}$) can be 1.75:1, indicating the width of the rear channel 105 is greater than the width of the lower channel 102. Similarly, the ratio of depths ($D_{RC}/D_{LC}$) can be greater than 1, for example, the ratio ($D_{RC}/D_{LC}$) can be 1.25:1, indicating the depth of the rear channel 105 is greater than the depth of the lower channel 102.

The rear channel 105 intersects the lower channel 102 at a cross-over region CX1. The cross-over region CX1 is a point of intersection of the first path X1 and the second path X2. At the cross-over region CX1 a front pin 350 (shown in FIG. 6) travelling along the first path X1 crosses the rear channel 105 without obstructing the rear pin 360 (in FIG. 6) travelling along the second path X2. Furthermore, the front pin 350 and the rear pin 360 can move simultaneously. Conventionally, cross-over regions do not exist in the guide blocks and a front pin never cross the path of a rear pin. The cross-over region CX1 enables to have a relatively smaller length of the guide block 100, thus making the guide block 100 compact.

The lower channel 102 and the upper channel 106 extend in the horizontal direction towards the left. The lower channel 102 is longer than the upper channel 106 and located below the upper channel 106. The lower channel 102 has a length $L_{LC}$ and a width $W_{LC}$. The lower channel 102 is located at a height $H_{LC}$ from the base of the guide block 100. The distance between the lower channel 102 and the upper channel 106 is $D_C$.

Figure 5A:
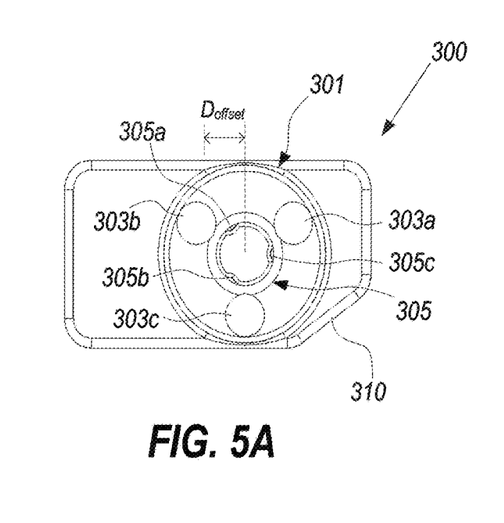
FIGS. 5A-5D illustrates different views of a check block of the guide block according to an exemplary embodiment of the present disclosure.
Figure 5B:
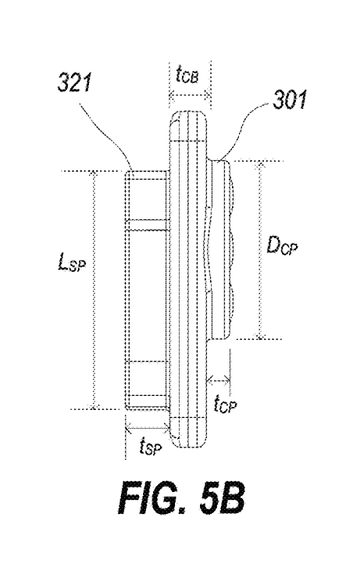
Figure 5C:
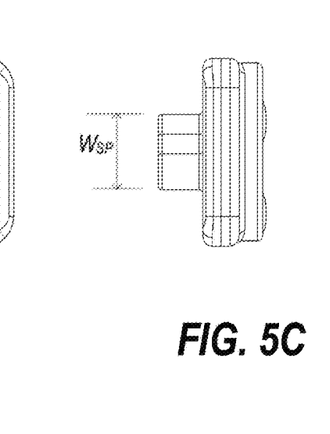
Figure 5D:
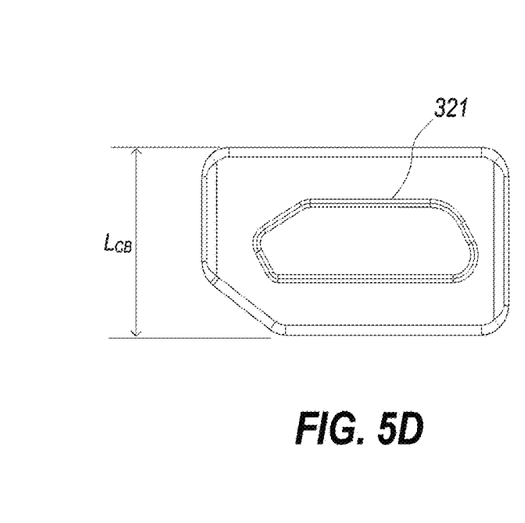

FIGS. 5A-5D illustrate different views of a check block of the check block 300 according to an exemplary embodiment of the present disclosure. FIGS. 5A and 5D, an elevation and a back view, respectively, show that the check block 300 has a significantly rectangular shape with a chamfered edge 310. The front side of the check block 300, in FIG. 5A, includes a font pin holder 301. The front pin holder 301 is a circular projection extending from the rectangular surface of the check block 300. The front pin holder 301 has a pin hole 305. The front pin hole 305 can hold a front pin 350 (illustrated in FIG. 6). The front pin hole 305 also include three indents 305a, 305b, and 305c on the inner side to provide a clearance between the front pin 350 and the check block 300. The indents 305a-305c also enables the front pin 350 to rotate relative to the check block 300. Furthermore, the front pin holder 301 is offset from the center of the check block 300 towards the chamfered edge 310 by a distance $D_{offset}$.

Furthermore, the check block 300 includes a sliding portion 321, illustrated in FIGS. 5D, 5B and 5C. The sliding portion 321 is a profiled projection extending from the back side of the check block 300. The sliding portion 321 rests in the front channel 101 of the guide block 100 (in FIG. 6). The profiled shape of sliding portion 321 allows the check block 300 to stay locked in the front channel 101, when in the first position P1 or the second position P2. Further, the profiled shape is such that it allows the check block 300 to slide into the lower channel 102 of the guide block 100, when pulled upwards while moving into the third position P3.

According to one embodiment, the length a length $L_{SP}$ of the sliding portion should be greater than the width of the mid-channel 103 of the guide block 100 to prevent the check block 300 from sliding down in the mid-channel 103 of the guide block 100.

The check block 300 also includes a plurality of bumps 303a, 303b, and 303c. The bumps 303a-303c provide a spacing between the front pin holder 301 and the shoe 200 (not illustrated) that can be connected to the front pin holder 301. Also, each of the bumps 303a-303c make a point contact with the shoe 200, thus reducing friction and facilitating smooth sliding motion of the check block 300.

Figure 6:
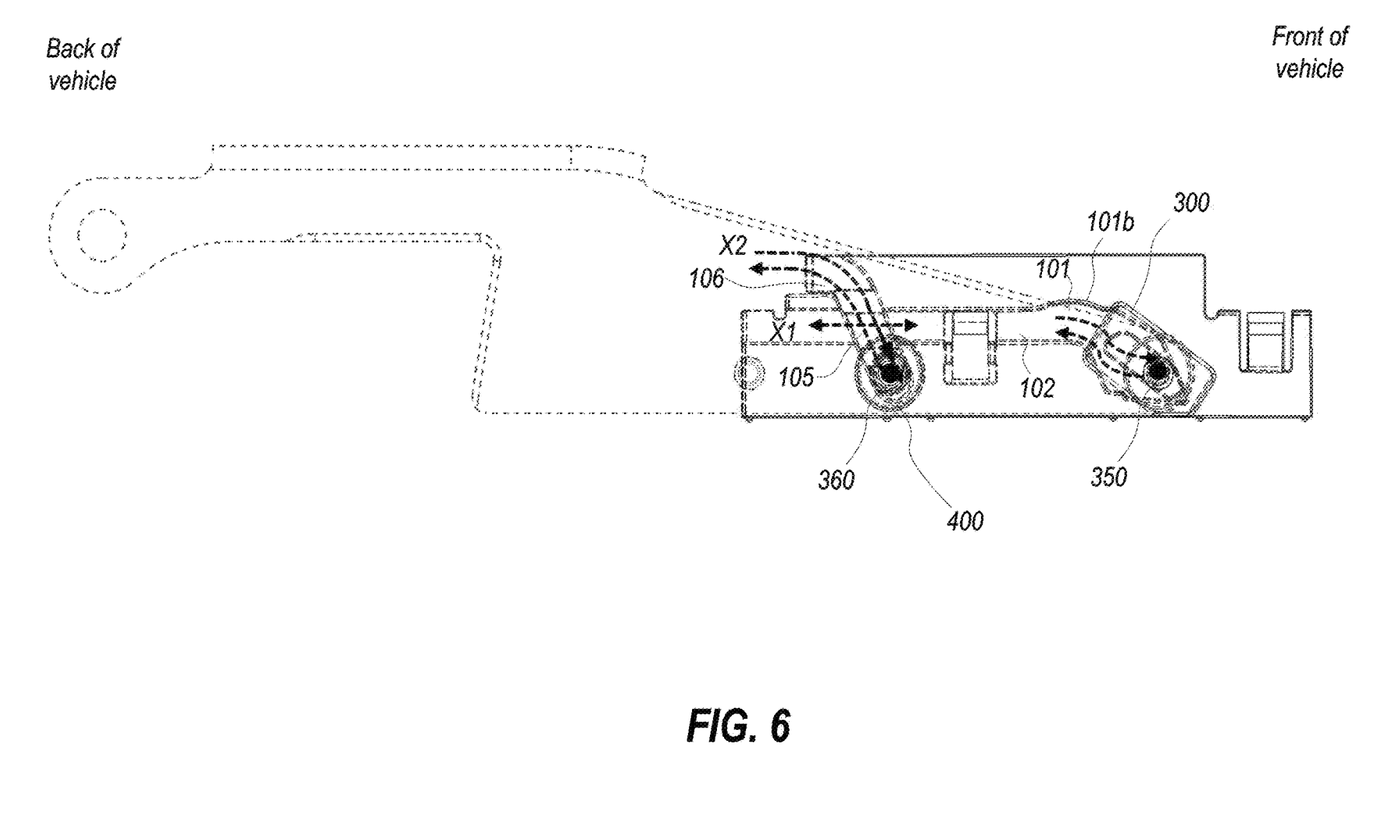
FIG. 6 illustrates pin movements in the guide block according to an exemplary embodiment of the present disclosure.

Referring to FIG. 6, the check block 300 enables the front pin 350 to travel back and forth along the first path X1. The sliding portion 321 of the check block 300 compensate for non-linear portion of the front channel 101, thus allowing the first pin 350 to travel along irregular shape of the curved edge 101b in a smooth manner.

Referring back to FIGS. 5A-5D, the check block 300 has a length $L_{CB}$, and thickness $t_{CB}$. The sliding portion 321 can have a length $L_{SP}$, a width $w_{SP}$, and thickness $t_{SP}$. The thickness $t_{SP}$ and length $L_{SP}$ of the sliding portion 321 is such that it can fit in the lower channel 102 of the guide block 100. As such, the width $w_{SP}$ is approximately same or less than the width $w_{LC}$ of the lower channel 102 (FIG. 4A). The circular portion 301 can have a diameter $D_{CP}$ and a thickness $t_{CP}$.

FIG. 6 illustrates the first path X1 and the second path X2 traveled by the front pin 350 and a rear pin 360 in the guide block according to an exemplary embodiment of the present disclosure. The front pin 350 is located in the front channel 101 connected via the check block 300. The front pin 350 travels along the first path X1 and passes across the rear channel 105 at the cross-over region CX1 when moving from the front channel towards the rear channel 105 along the first path X1. Furthermore, the second pin 360 moves along the second path X2 simultaneously with the first pin 350 traveling along the first path X1. The second pin 360 passes the cross-over region CX1 before the first pin 350 reaches the cross-over region CX1, thus the second pin 360 does not obstruct the motion of the first pin 350.

The movement of the pins 350 and 360 is further transmitted to the sliding panel A via additional mechanical elements connected between the pins 350 and 360 and the sliding panel A.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A guide block for a sunroof of an automobile, comprising:
    a front channel in a surface of the guide block that extends upwards and connects to a lower channel at a first angle with respect to the lower channel, the front channel and lower channel forming a first path; and
    a rear channel in the surface of the guide block that extends upwards and connects to an upper channel at a second angle with respect to the upper channel, the rear channel and the upper channel forming a second path,
    wherein the first path and the second path intersect at a cross-over region.

2. The guide block according to claim 1, further comprising a check block slidably connected to the first path, the check block holding a front pin.

3. The guide block according to claim 2, wherein the front pin located in the first path passes across the rear channel at the cross-over region when moving from the front channel towards the rear channel along the first path.

4. The guide block according to claim 3, wherein the front pin crosses the rear channel after a rear pin located in the second path travels upwards along the rear channel into the upper channel, wherein the front pin and the rear pin are moving simultaneously.

5. The guide block according to claim 1, wherein the first angle of the front channel is greater than the second angle of the rear channel making the rear channel steeper than the front channel with respect to a horizontal direction of the guide block.

6. The guide block according to claim 5, wherein the front channel has a variable width that increases from the lower channel to a base edge of the front channel.

7. The guide block according to claim 6, wherein the base edge includes a notch to orient and guide an element in the front channel in an upward direction.

8. The guide block according to claim 1, wherein the rear channel is substantially straight, has an uniform width, and is longer in length than the front channel.

9. The guide block according to claim 1, wherein the lower channel and the upper channel are substantially parallel and extend a horizontal direction of the guide block.

10. The guide block according to claim 9, wherein the lower channel is longer in length than the upper channel and located below the upper channel in a vertical direction of the guide block.

11. The sliding apparatus according to claim 1, further comprising a mid-channel located between the rear channel and the front channel.

* * * * *